United States Patent [19]

Grassin D'Alphonse et al.

[11] Patent Number: 5,159,652
[45] Date of Patent: Oct. 27, 1992

[54] QUICK-ACTION CONNECTOR FOR OPTICAL FIBERS

[75] Inventors: Emmanuel Grassin D'Alphonse, Paris; Serge Dubois, Sevran; Norbert Valade, Le Blanc Mesnil, all of France

[73] Assignee: Radiall, Rosny-Sous-Bois, France

[21] Appl. No.: 718,232

[22] Filed: Jun. 20, 1991

[30] Foreign Application Priority Data

Jun. 21, 1990 [FR] France ............................. 90 07793

[51] Int. Cl.$^5$ ............................................. G02B 6/26
[52] U.S. Cl. ........................................ 385/56; 385/53; 385/70
[58] Field of Search ................. 385/53, 56, 58, 60, 385/62, 66, 70, 72

[56] References Cited

U.S. PATENT DOCUMENTS

| | | | |
|---|---|---|---|
| 4,470,660 | 9/1984 | Hillegonds et al. | 385/58 |
| 4,726,647 | 2/1988 | Kakii et al. | 385/60 |
| 4,762,388 | 8/1988 | Tanaka et al. | 385/60 |
| 4,762,389 | 8/1988 | Kaihara | 385/60 |
| 4,779,950 | 10/1988 | Williams | 385/58 |
| 4,872,736 | 10/1989 | Myers et al. | 385/60 |
| 4,898,446 | 2/1990 | Hinckley | 385/72 |
| 5,066,096 | 11/1991 | Krausse | 385/58 |
| 5,073,042 | 12/1991 | Mulholland et al. | 385/56 |
| 5,109,452 | 4/1992 | Selvin et al. | 385/56 |
| 5,113,463 | 5/1992 | Nodari | 385/58 |

FOREIGN PATENT DOCUMENTS

| | | | |
|---|---|---|---|
| 0156397 | 3/1985 | European Pat. Off. | 385/56 X |
| 0195432 | 3/1986 | European Pat. Off. | 385/56 X |
| 0338727 | 4/1989 | European Pat. Off. | 385/56 X |

OTHER PUBLICATIONS

Patent Abstracts of Japan, vol. 13, No. 162 (P-859) [3510] Apr. 19, 1989 & JP-A-64 506 (NTT) Jan. 5, 1989.

*Primary Examiner*—Brian Healy
*Attorney, Agent, or Firm*—Schweitzer Cornman & Gross

[57] ABSTRACT

Connector for optical fibers, comprising two plug pins mounted one at the end of each of the fibers to be connected, a female reconstitution coupling (1) for supporting and aligning the two plug pins face to face; each of the plug pins being held in a plug body affixed to the cable containing the optical fiber to be connected, each of the plug bodies and the coupling containing snap-in connection means (29, 16); an operating slider (3) is mounted around each of the plug bodies. The female reconstitution coupling (1) has an axial tubular piece (10) whose outer surface (15) constitutes a surface for the mechanical guidance of the plug body, and of which at least a part of the interior surface serves as a means for the mechanical guidance of the plug pin in the coupling (1).

11 Claims, 3 Drawing Sheets

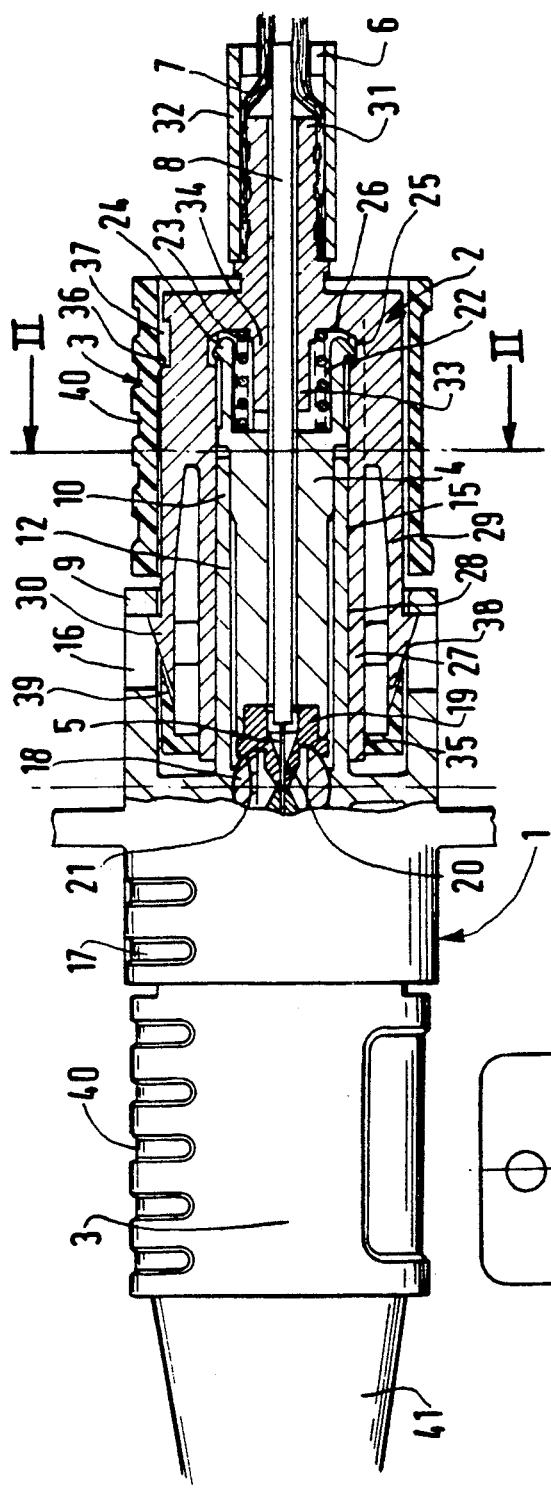
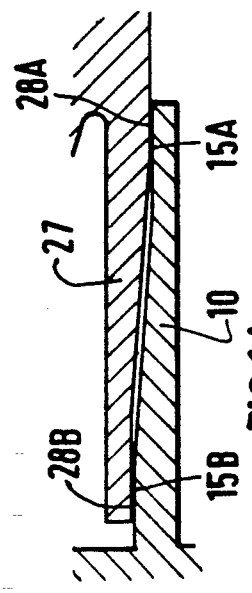
FIG.1A
FIG.1
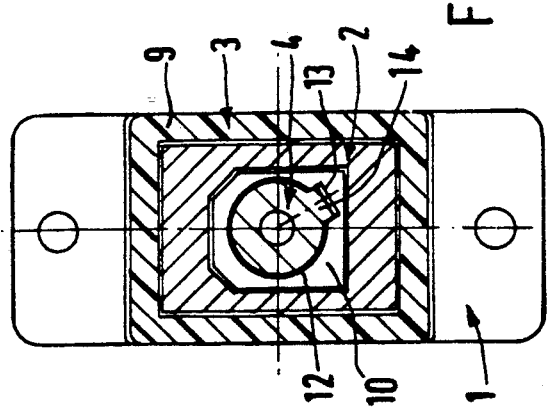
FIG.2

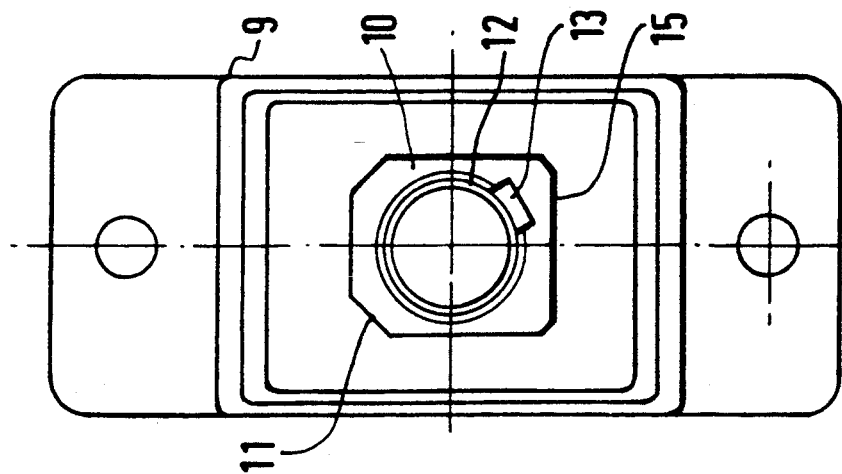
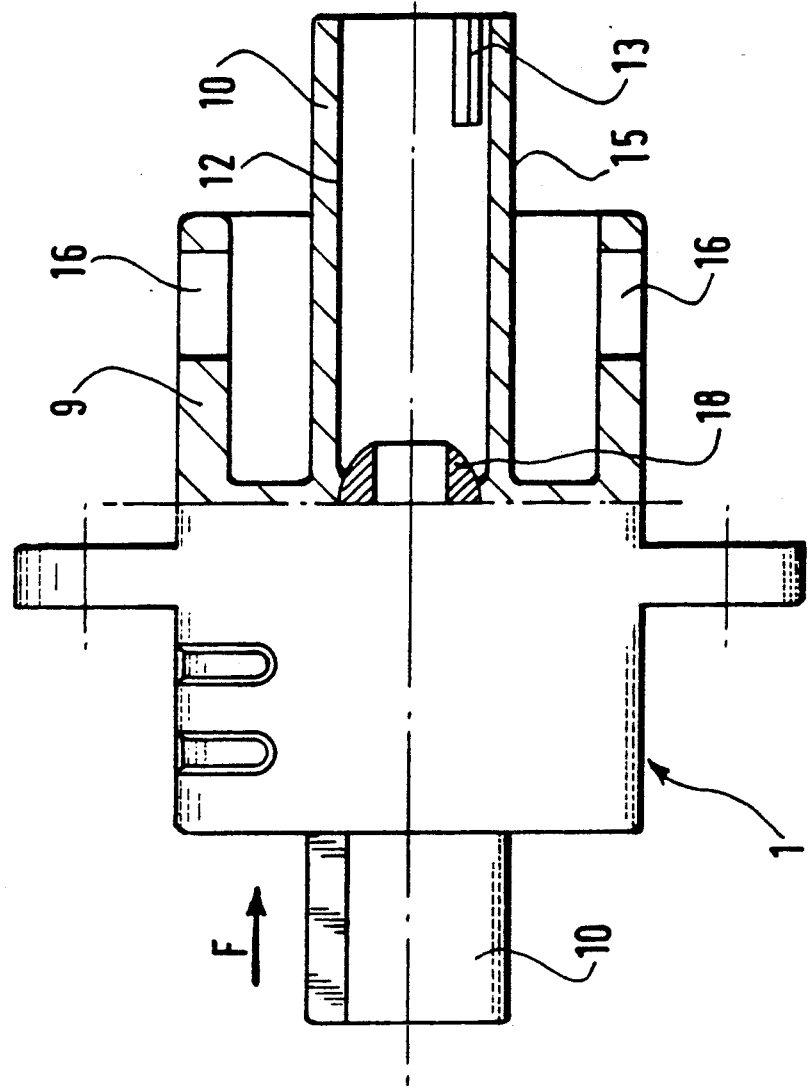

QUICK-ACTION CONNECTOR FOR OPTICAL FIBERS

BACKGROUND OF THE INVENTION

The present invention relates to a connector for optical fibers, comprising two plug pins mounted one at the end of each of the fibers, to be connected, a female reconstitution coupling having a longitudinal bore for supporting and aligning the two plug pins face to face, each of the plug pins being held in a plug body affixed to the cable containing the optical fiber to be connected, each of the plug bodies and the coupling containing snap-in connection means cooperating to affix the plug body axially to the coupling, and an operating slider mounted around each of the plug bodies and disposed so as to produce, by an axial movement toward the coupling, an engagement of cooperating locking means of the plug and coupling bodies, and to produce, by an axial movement in the opposite sense, a disengagement of the said cooperating locking means and a separation of the plug body from the coupling.

The quick-action connectors for optical fibers of the so-called push-pull type, such as those sold by Nippon Telegraph and Telephone Company under the reference SC are very simple to operate once the plug body containing the plug pin is mounted and affixed to the cable containing the optical fiber, since the operations of connecting and disconnecting from the coupler are performed by simple pushing and pulling movements on the operating slider.

On the other hand, these known connectors have important disadvantages for the user in the operation of mounting the plug body and pin plug on the optical fiber cable, in particular, owing to the great number of components that have to be manipulated for the purpose of assembly.

Thus, the structure of the coupling, of the plug body and of the operating slider, particularly due to the arrangement of the cooperating locking means and surfaces for guiding these components one on the other, is such that in the assembled state the guiding slider covers the rear portion of the plug body at which the latter has to be affixed by crimping to the optical fiber cable, such that the operating slider can be installed on the plug body only after the latter has been affixed to the optical fiber. Consequently, in practice, before proceeding to install the plug body and plug pin on the fiber-optic cable, the user has a separate plug body and a separate operating slider and cannot place the operating slider on the plug body until the latter has been attached to the cable.

Furthermore, the structure of the plug pin and plug body of the known connectors makes relatively delicate the operation of setting the plug pin in place at the end from which the end of the optical fiber was introduced and affixed by gluing, considering particularly the need to insert a compression spring thrusting against the surfaces of the plug body and plug pin to push the latter resiliently toward the center of the coupling, and thus isolate any mechanical stress on the plug body.

SUMMARY OF THE PRESENT INVENTION

The present invention proposes to create a connector for optical fibers, for quick attachment and release, which will be particularly easy for the user to employ, particularly during the operation of mounting the plug body on the optical fiber cable, due to the particularly small number of the parts to be assembled and to structural features permitting the particularly simple and quick assembly of these parts.

The connector according to the present invention is essentially distinguished by the fact that the female reconstitution coupling has an axial tubular piece whose outer surface constitutes a surface for the mechanical guidance of the plug body, and of which at least a part of the interior surface serves as a means for the mechanical guidance of the plug pin in the coupling.

In one embodiment of the invention, the plug body and the female reconstitution coupling have mechanical guiding surfaces in mutual contact, said surfaces extending on the plug body and respectively on the coupling, beyond the cooperating locking means rspectively provided on these elements.

In a second embodiment of the invention, the plug body and the female reconstitution coupling have two mechanical guidance surfaces confronting one another with a slight clearance, disposed on the ends of the plug body and coupling, respectively, on either side of the cooperating locking means respectively provided on these elements.

Unlike the known connectors, it is in this manner that in both embodiments a direct guidance between the plug body and the coupling is provided.

The tubular piece has preferably a noncircular section, in particular an irregular polygonal section, corresponding to the internal section of the wall of the plug body. In particular, said sections can be square or rectangular, with at least one chamfer serving to forestall misorientation.

According to a particular feature of the invention, the plug body has means on its rear portion for the fixation of the plug body to an optical fiber cable, said means being accessible for the purpose of said fixation even when the operating slider is mounted around said plug body.

The means permitting connection to the optical fiber cable are preferably constituted by a tubular sleeve projecting axially from the rear end face of the plug body, and around which the reinforcement and/or the outer sheath of the optical fiber cable is fastened by crimping a ferrule around it.

To assure correct positioning for the assembly of the plug body and operating slider mounted thereon with the coupling, the coupling and/or the operating slider can be provided advantageously with visual orientation markings.

The cooperating locking means of the plug body and coupling advantageously have radially resilient tongues with barbed ends which lock by engaging in openings in the outer wall of the coupling, the operating slider being arranged so that, when it is shifted rearwardly, it will press against the extremities of said tongues and push them into the interior, disengaging them from the openings in the outer wall of the coupling.

In one particular embodiment, the plug pin which is to receive the end of the optical fiber has snap fastening means inside of the plug body in its rear portion. The plug body furthermore advantageously has within it an annular sleeve for receiving a compression spring which thrusts at one end against the base of the sleeve and at the other end against the bottom of a recess in the end of the plug pin.

The length of the annular sleeve is preferably great enough to guide the compression spring. Furthermore, the base of the sleeve connected to the plug body and the end of the spring are arranged so that the compression spring will remain affixed to the sleeve such that, in the absence of the plug pin and unlike the case with the known connectors, the spring need no longer be delivered to the user in the form of a separate part.

By virtue of the features of the invention, it is possible to have a single assembly constituted of the plug body, the operating slider, and the compression spring.

The different components of the connector, according to the invention, can advantageously be made of plastic in a particularly economical manner.

The metal components can be limited to the means used to position the optical fibers precisely confronting one another in the coupling.

These means can be of different types and in particular the type described by Radiall S.A. in EP-A-0063085, in which the female coupling has in its central portion, inside of its longitudinal bore, an abutment for the male pins, particularly a sphere having an axial opening through it, and around the latter a contact surface opposite each of the male pins which, for their part, have an axial tubular protuberance which can engage in the orifice of the abutment body, and a conduit in which the optical fiber can be introduced with clearance and fixed such that its end coincides with the end of the protuberance. Each of the pins furthermore has, set back from the protuberance and surrounding the rear portion of the latter, an annular cavity whose wall, preferably of a conical profile, defines a surface of contact with the confronting surface of the abutment body of the female coupling under the action of a longitudinal thrusting means such as a compression spring. The confronting surfaces of the abutment body of the male pins are arranged such that, upon any relative movement of the surfaces in contact, the end of a fiber, at the level of the end face of the protuberance of a male pin, will be held at a constant, predetermined distance from the center of the abutment body.

According to the invention, only the abutment body of the coupling and the end portion of the pin having the tubular protuberance and the surfaces of contact with the abutment body, need to be of a hard material such as a metal, a ceramic, or certain plastic materials, the rest of the pin and the other components of the connector being then able to be of plastic.

Other advantages and features of the invention will appear from the reading of the following description of an embodiment that is by no means restrictive, in conjunction with the appended drawings:

DESCRIPTION OF DRAWINGS

FIG. 1 is a diagrammatic view, partially in section, of a connector according to the invention;

FIG. 1A is a fragmentary view, in section, showing a variant construction of the plug body and female reconstitution coupling of a connector according to the invention;

FIG. 2 is a section taken on line II—II of FIG. 1;

FIG. 4 is an elevation, partially in section, of a female reconstitution coupling of the connector of FIG. 1; and FIG. 5 is an end view in the direction of arrow F of FIG. 4.

DETAILED DESCRIPTION OF THE INVENTION

Figure 3:
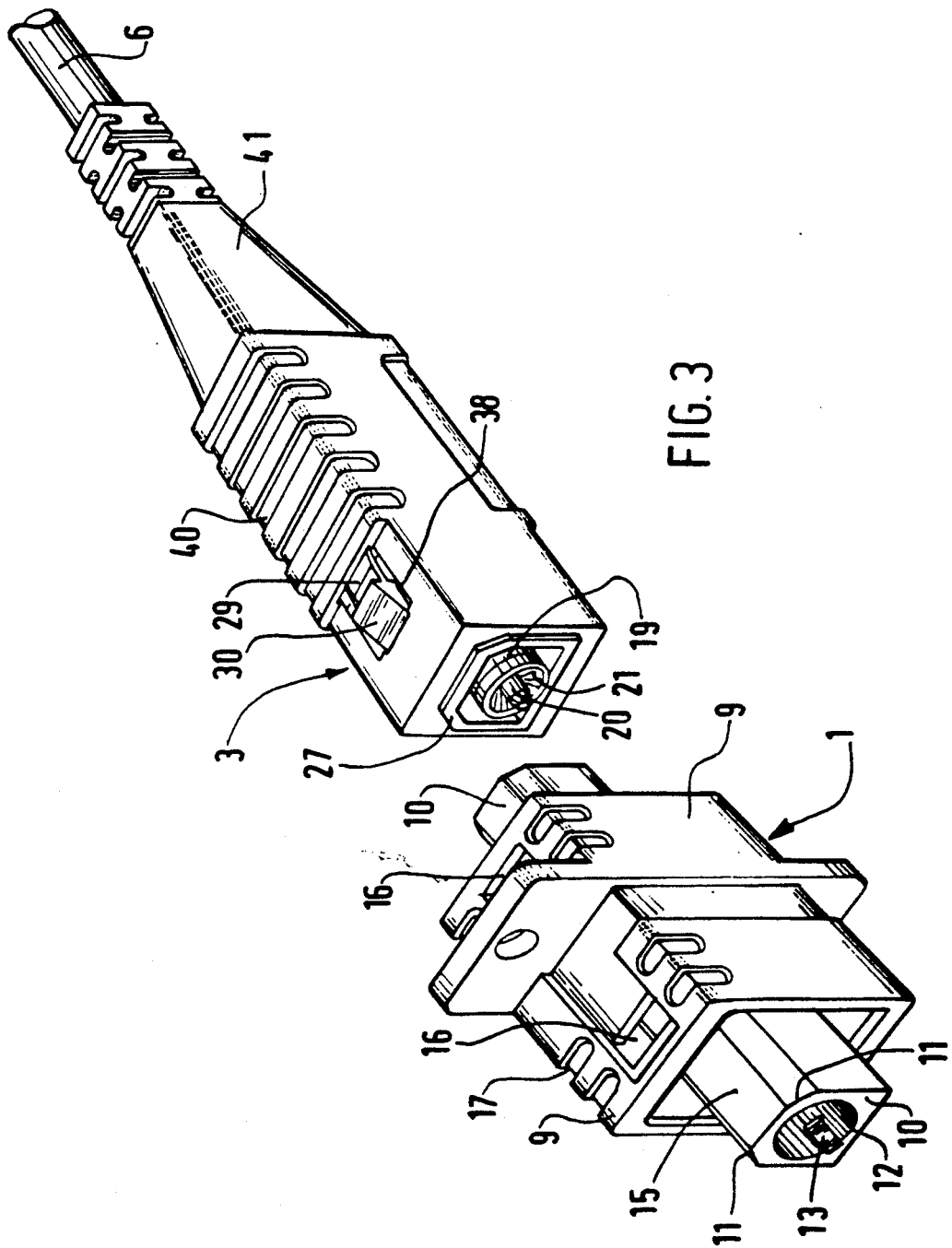
FIG. 3 is a perspective view of a connector according to the invention in the disconnected state.

Referring to the drawing, it can be seen that the connector according to the invention comprises as a chief component a female reconstituion coupling generally identified by 1, two plug bodies identified generally by 2, on each of which is placed an operating slider or stripper 3, and inside of which are contained plug pins generally identified by 4.

The connector according to the invention is intended for coupling optical fibers 5 contained in a single-fiber optical cable comprised of an external sheath 6 (FIG.3), a reinforcement 7 and an internal sheath 8 surrounding the fiber 5.

The connector according to the invention can be employed either with monomode optical fibers or with multimode optical fibers.

The female coupling 1 has an outer wall 9 of substantially rectangular shape in the example depicted, and two tubular pieces 10 of rectangular section, with two chamfers 11, each of the tubular pieces 10 extending axially, as best seen in FIGS. 3 and 4, beyond the front faces of the outer wall 9 of the connector.

The inside surface 12 of the tubular pieces 10 is of circular section and has near its extremity a keyway 13 in which is engaged a rib forming a key 14 of plug pin 4 to establish the angular orientation of the plug pin 4 with respect to the coupling.

On account of the chambers 11, the outside surface 15 of the tubular pieces 10 has the form of an irregular hexagon.

The outer wall 9 of the coupling has, in two opposite faces, openings 16 constituting the locking means provided on the coupling for cooperation with locking means on the plug body, as will be explained further on.

The coupling furthermore has at its upper portion visual orientation markings in the form of notches 17.

The coupling has internally a sphere 18 provided with a longitudinal bore and used for the mutual positioning of the ends of the optical fibers 5 each held fast in a plug pin 4, and, more precisely, in an end piece 19 of the plug pin having a terminal protuberance 20 and an annular recess 21 of conical shape.

For a detailed description of all means for the positioning of confronting optical fibers, one can refer to Patent EP-A-O0063085 of Radiall S.A.

The plug pin 4, in addition to the optical fiber positioning piece 19 mounted at the front end, has at its rear portion a recess 22 containing a compression spring 23, and around the said recess 22 resilient catches 24 which can snap into a recess 25 in the plug body 2 created close to its bottom 26.

The plug pin 4 is thus held in the plug body with a possibility for limited axial displacement.

Each plug body 2 has at its front a wall 27 having the same section as the section of the outer surface 15 of the tubular pieces 10 of the coupling 1, the wall 27 having an internal surface 28 constituting a surface for guidance on the outer surface 15.

In the variant illustrated in FIG. 1A, the tubular pieces 10 of the coupling 1 and the wall 27 of the plug body 2 have at their respective ends two mechanical guidance surfaces disposed facing one another with a slight clearance 15A, 28A and 15B, 28B, respectively.

For locking onto the coupling, each plug body 2 has tongues 29 of radial elasticity having a barbed outside shape 38 which snap into the openings 16 in the coupling, as seen in FIG. 1.

At its rear portion the plug body 2 has, in the form of an integral prolongation, a tubular portion or sleeve 31 having a notched exterior surface for holding the plug body on the cable by crimping a ferrule 32. In the example depicted, the fixation of the cable is performed in an area where the outer sheath has been pulled back so as to hold fast, when the crimping is performed, the reinforcement 7 of the cable between the sleeve 31 and the ferrule 32.

The plug body furthermore has on the inside a projection in the form of an annular sleeve 33 around which is fitted the spring 23 so as to be held at its exttremity on the base 34 of the projection 33.

The connector according to the invention lastly comprises, for each of the plug bodies 2, an operating slider 3 for grasping the plug body in order to shift it toward the coupling to lock it on and away from the coupling to unlock it.

Each operating slider has a tubular end portion 35 whose inside cross section corresponds to the outside section of the wall 27 of the plug body and provides the longitudinal guidance of the operating slider with respect to the plug body.

The longitudinal movement of the operating slider with respect to the plug body is limited by a projection 36 of the sleeve, which is engaged in a recess 37 of limited length on the plug body. The cooperation of this projection 36 with the recess 37 also assures the retention of the operating slider on the plug body, the tow parts being able to be preassembled and thus delivered to the user in the form of an assembled unit.

Each operating slider 3 has in the vicinity of its front portion the openings 38 defined by an inclined front wall 39 of a shape corresponding to that of the inclined flank of the barbed end 30 of the tongues 29 of the plug body, so that, when a rearward traction is exerted on the operating slider, the surface 39 will slide along the inclined flank of the barbed portions 30, pushing them toward the interior, which permits disengaging the plug body from the coupling so as to unlock it.

Each operating slider furthermore has visual orientation markings in the form of indentations 40 similar to the indentations 17 provided on the face of the coupling which have to be aligned with the face of the operating slider, so as to obtain the desired relative disposition of the plug body and coupling enabling the plug body to be engaged in the coupling.

Lastly, in the drawing can be seen the guiding sleeves 41 of the optical fiber cable (one of which is omitted on the right, sectioned side of FIG. 1).

In view of the structure of the connector described above, it is employed in the following manner.

First, the end of an optical fiber cable is stripped so as to lay bare, in successive sections, a length of fiber, a length of inside covering, and a length of reinforcement.

The appropriate plug pin is selected for the outside diameter of the fiber, it is coated with resin on the interior, and it is snapped into a plug body which inself is part of an assembly composed of the plug body, an operating slider and a spring.

A crimp ferrule is slipped over the optic cable, followed by the plug pin assembly, the plug body, the operating slider and the spring; the ferrule is crimped, the resin is made to set, and finally the end of the fiber is polished.

The operation is repeated for the second optical fiber to be connected, and the two cables, each provided with plug pin, a plug body and an operating slider, can be set in place on the coupling, the plug body snapping into the coupling as explained above.

To unlock the connection, it suffices to draw back the operating slider corresponding to the fiber to be disconnected, which unlocks the plug body from the coupling, enabling the corresponding assembly of plug body, operating slider, plug pin and the cable to be extracted.

Althrough the invention has been described in connection with one particurlar embodiment, it is quite evident that it is by no means limited thereto, and that variants and modifications can be made in it without thereby departing from its scope or its spirit. The disclosure of priority application 90 07793 filed Jun. 21, 1990 in France is incorporated by reference herein.

We claim:

1. Connector for optical fibers comprising two plug pins mounted at the end of each of the fibers to be connected, a female reconstitution coupling having a longitudinal bore for supporting and aligning the two plug pins face to face, each of the plug pins being lodged in a plug body affixed to the optical cable containing the optical fiber to be connected, each of the plug bodies and the coupling having snap locking means cooperating to hold the plug body axially fast on the coupling, and a sliding collar mounted around each of the plug bodies and adapted to produce, by an axial displacemetnt toward the coupling, an engagement of cooperating locking means of the plug body and coupling, and to produce, by an axial displacement in the opposite diretion, a disengagement of said cooperating locking means and a separation of the plug body from the coupling, characterized by the fact that the female reconstitution coupling (1) comprises a tublar axial piece (10) whose outer surface (15) constitutes a mechanical guiding surface for the plug body (2) and, the plug body (2) has at its rear portion affixation means (31) for affixing the plug body to the optical fiber cable (6).

2. Connector according to claim 1, characterized by the fact that the plug body (2) and the female reconstitution coupling (1) have continuous mechanical guiding surfaces (28, 15) in mutual contact, the said surfaces extending, on the plug body and respectively on the coupling, beyond cooperating locking means (30, 16) respectively provided on these elements; at least a portion of inside surface of the plug (2) serves as a mechanical guiding surface for the plug pin (4) in the coupling (1).

3. Connector according to claim 1, characterized by the fact that the plug body (2) and the female reconstitution coupling (1) have two mechanical guiding surface facing one another with a slight clearancce, disposed at the ends of the plug body (28A, 28B), and respectively those of the coupling (15A, 15B) on both sides of the cooperating locking means (30, 16) respectively provided on these elements; at least a portion of the inside surface of the plug (2) serves as a mechanical guiding surface for the plug pin (4) in the coupling (1).

4. Connector according to claim 1, characterized by the fact that the said tubular piece (10) has a noncircular section, particularly an irregular polygonal section, corresponding to the internal section of the wall (27) of the plug body having the said guiding surface (28); at least a portion of the inside surface of the plug (2) serves as a mechanical guiding surface for the plug pin (4) in the coupling (1).

5. Connector according to claim 1 characterized by the fact that said affixation means being accessible for the purpose of affixing the plug body even when the operating slider (3) is mounted around the said plug body (2); at least a portion of the inside surface of the plug (2) serves as a mechanical guiding surface for the plug pin (4) in the coupling (1).

6. Connnector according to claim 5, characterized by the fact that the affixation means (31) is consitututed by a tubular projection extending axially from the rear end face of the plug body (2), around which the shielding (7) and/or the outer sheath (6) of the optical fiber cable is fastened by the crimping of a peripheral ferrule.

7. Connector according to claim 1 characterized by the fact that the cooperating locking means of the plug body and coupling have tongues (29) with barbed ends (30) and radial elasticity which engage for locking in openings (16) in the outer wall (9) of the coupling, the locking collar (3) being adapted so that when shifted rearward the ends of the said tongues can be pressed and pushed inwardly releasing them from the openings in the outer wall of the coupling; and least a portion of the inside surface of the plug (2) serves as a mechanical guiding surface for the plug pin (4) in the coupling (1).

8. Connector according to claim 1 characterized by the fact that the plug pin (4) has at its rear portion snap locking means (24) on the inside of the plug body; at least a portion of the inside surface of the plug (2) serves as a mechanical guiding surface for the plug pin (4) in the coupling (1).

9. Connector according to claim 1 characterized by the fact that the plug body (2) has internally an annular sleeve (33) around which a compression spring (23) is placed which thrusts at one end against the base (34) of the sleeve and at the other end against a bottom wall of an end recess (22) in the plug pin (4); at least a portion of te inside surface of the plug (2) serves as a mechanical guiding surface for the plug pin (4) in the coupling (1).

10. Connector according to claim 9, characterized by the fact that the compression spring (23) is mounted on the said sleeve (33) so as be affixed to the plug body (2).

11. Connector according to claim 1 characterized by the fact that the coupling (1) and the locking collar (3) have visual indexes for mutual orientation (17, 40); at least a portion of the inside surface of the plug (2) serves as a mechanical guiding surface for the plug pin (4) in the coupling (1).

* * * * *